United States Patent [19]
Hoffmann et al.

[11] Patent Number: 5,504,483
[45] Date of Patent: Apr. 2, 1996

[54] CONTROL OF INPUT DEVICES VIA A KEYBOARD INTERFACE

[75] Inventors: Stefan Hoffmann; Rüdiger Koeppen; Michael Kochmann, all of Berlin, Germany

[73] Assignee: Siemens Nixdorf Informationssysteme Aktiengesellschaft, Paderborn, Germany

[21] Appl. No.: 256,772
[22] PCT Filed: Jun. 25, 1993
[86] PCT No.: PCT/DE93/00585
 § 371 Date: Jul. 22, 1994
 § 102(e) Date: Jul. 22, 1994
[87] PCT Pub. No.: WO94/02892
 PCT Pub. Date: Feb. 3, 1994

[30] Foreign Application Priority Data

Jul. 17, 1992 [DE] Germany ............... 42 23 674.6

[51] Int. Cl.$^6$ ............................................. H03M 11/00
[52] U.S. Cl. ........................... 341/22; 341/20; 340/825.3; 364/709.11
[58] Field of Search .................. 341/20, 22, 23, 341/26, 30; 345/156, 157, 168; 364/188–190, 709.01, 709.05, 709.11; 340/825.3, 825.33, 825.35; 235/380

[56] References Cited

U.S. PATENT DOCUMENTS

| | | | |
|---|---|---|---|
| 4,774,689 | 9/1988 | Morisawa | 345/157 |
| 4,964,075 | 10/1990 | Shaver | 341/23 |
| 5,323,153 | 6/1994 | Sonobe et al. | 341/20 |

FOREIGN PATENT DOCUMENTS 0441032  8/1991  European Pat. Off. .

*Primary Examiner*—John K. Peng
*Assistant Examiner*—Andrew Hill
*Attorney, Agent, or Firm*—Hill, Steadman & Simpson

[57] ABSTRACT

For operating input devices such as magnetic card readers (22) or keyswitches (23) on personal computers (11), these are connected to the keyboard processor (18) and activated by hitherto unused control codes. The data of the input devices are recoded into data for possible key operations and the data transmission to the personal computer is initiated by the code for a non-existent key. As a result, the keyboard controller in the personal computer does not need to be reprogrammed, and the function of the input device cannot be simulated via the keyboard.

4 Claims, 2 Drawing Sheets 5,504,483

CONTROL OF INPUT DEVICES VIA A KEYBOARD INTERFACE

BACKGROUND OF THE INVENTION

1. Field of the Invention

The invention relates to the connection of input devices to personal computers via an already existing keyboard interface.

2. Description of the Related Art

As a rule personal computers have a keyboard for data input for which a standard interface has emerged, as is described in IBM Personal System/2 Technical Reference Manual for example. Additional input devices are required in many application areas, for example reading devices for magnetic cards, which for cost reasons are frequently equipped with a special interface, the operation of which is time-critical. It has hitherto been necessary to use additional interfaces for these input devices on the personal computer, for example serial interfaces compliant with the V.24 standard. When personal computers are used as control units in point-of-sales terminals, for example, this however results in an additional outlay for the interface in the computer and in the unit which converts the data supplied by the magnetic card reader into that of the serial standard interface, the V.24 interface in the example, and fulfils the time conditions.

A keyboard with connected peripheral devices is described in the article entitled "Mehr als eine Tastatur" (More than a keyboard) by M. Güntner and W. Kredler, Elektronik, Issue 21, 1987, pp. 126 to 130. The data are clearly transmitted in this case from the peripheral devices via the serial V.24 interface.

Transmission via the keyboard interface is not described. Were one nevertheless to do this, the problem would arise that the keyboard controller contained in the PC would only forward such key codes belonging to previously defined keys. As a result, it is not possible to transmit all the data from the magnetic stripe without modifying the keyboard controller or reducing the data rate by means of the multiple character representation proposed in the article. Particularly in the latter case, this data can then be replaced by key operations. For the sake of reliability, and in accounting systems in particular, it is however desirable that it be possible to identify the data of the peripheral device clearly as such, and it should not be possible for the data to be simulated by key actuations.

SUMMARY OF THE INVENTION

An object of the invention is the operation of input devices at the keyboard of a personal computer which permits transmission of all the code characters of a peripheral device without reprogramming the keyboard controller in the personal computer but nevertheless does not increase the data volume. It is furthermore desirable that a simulation of the input device by key operation be precluded and a status interrogation and control of the input devices be possible.

The present invention achieves this and other objects in that the additional input device or devices are connected to the keyboard processor and send their data via the keyboard interface. The data of the input device are buffered in the keyboard processor and sent to the PC. In addition, the codes of the input devices are converted into normal key codes so that no modifications are required to the keyboard controller in the personal computer. The data of the input device are introduced by dummy key codes which cannot be generated on the keyboards used; in this way a user cannot modify or replace the data of the input devices by means of keyboard operations. However, key codes which correspond to possible keys are used so that the keyboard controller in the personal computer does not need to be reprogrammed. For this reason the binary data of the magnetic card reader are also converted into possible key codes. In order to distinguish between the data of the magnetic card reader and those of the keys, a device driver or resident filter program is required, but no reprogramming of the keyboard controller.

BRIEF DESCRIPTION OF THE DRAWINGS

The invention will be explained below with reference to two exemplary embodiments.

DETAILED DESCRIPTION OF THE PREFERRED EMBODIMENTS

Figure 1:
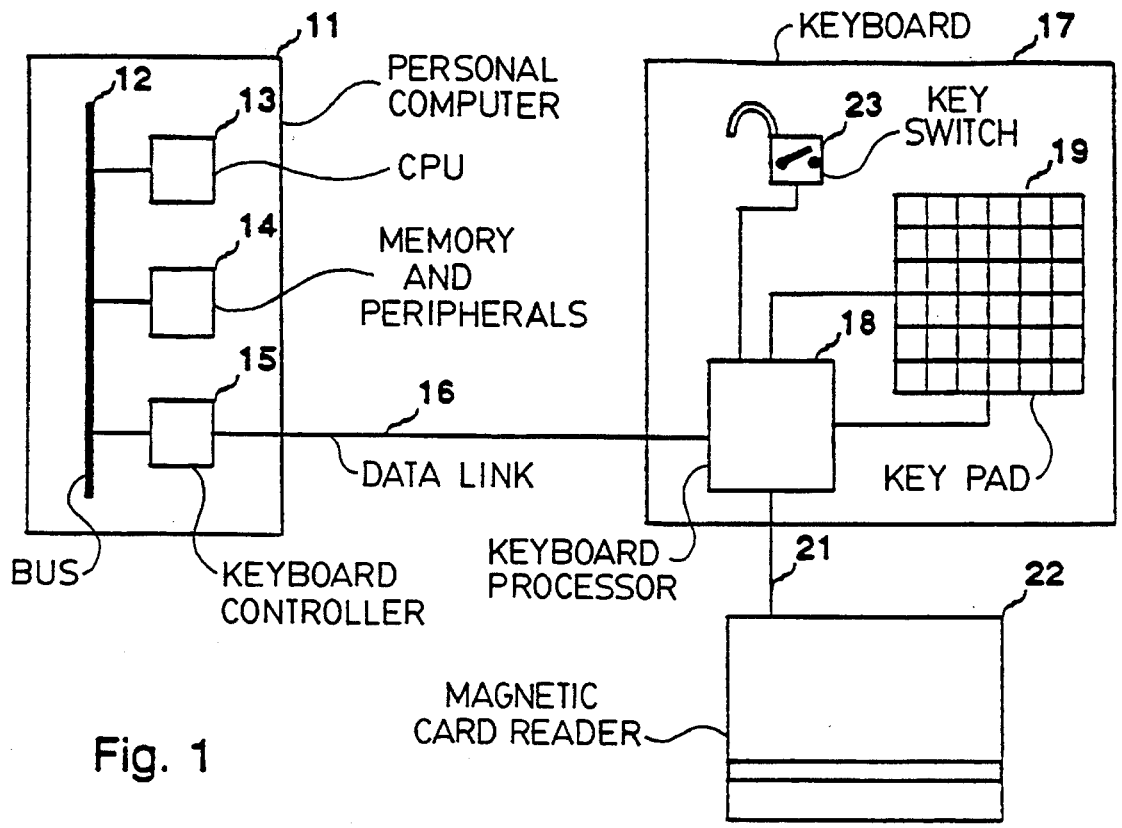
FIG. 1 shows the design of a personal computer with two input devices connected.

In FIG. 1 a conventional personal computer 11 is symbolized with a bus 12, a CPU 13, further memory and peripheral elements which for the sake of clarity have been grouped together under the symbol 14, and the keyboard controller 15 (e.g. an Intel 8042 chip may be used as a keyboard controller) which is connected to the keyboard 17 via a data link 16. The keyboard 17 contains a keyboard processor 18 (e.g. an Intel 8052 Chip may be used as a keyboard processor) which is connected to the keypad 19, usually realized in matrix form. The keyboard processor 18 detects key operations of the keypad 19 and sends corresponding codes via the data line 16 to the keyboard controller 15 in the personal computer, from which the data are called up by programs in the memory 14 which are executed by the CPU 13. The keyboard controller 15 in the personal computer can also send data to the keyboard processor 18 in the keyboard for initialization, control and diagnostic purposes. The procedures and methods used for this purpose are likewise described in the IBM Personal System/2 Technical Reference Manual for example. It should be noted here that the codes sent from and to the keyboard may comprise one or more bytes.

In comparison with a conventional personal computer, two input devices have been added in FIG. 1. One is a magnetic card reader 22 ('swipe card reader', SCR) which is connected to the keyboard processor 18 via an interface 21 specific to this device. The second is a switch 23 operated by a key.

The procedure in the keyboard processor 18 is as follows: after switching on or resetting by transmission of the code 'FF' from the personal computer to the keyboard, the magnetic card reader 22 is disabled. It is only enabled once the personal computer sends the code 'DO' after the following procedure represented in pseudocode:

```
procedure new_got_key(x: key);
pragma base 16
begin
        if x in [0D0]
        then if SCR_exists
```

```
                then send(0FA);
                        enable_SCR;
                        exit;
                else send(0FE);
                        exit;
                fi;
        else if x in [0D1]
                then if key_switch_exists
                        then send(0FA);
                                enable_key_switch;
                                exit;
                        else send(0FE);
                                exit;
                        fi;
                else old_got_key(x);
                        exit;
                fi;
end;
```

The repeat code 'FE' is returned here if no magnetic card reader is present; this code is always used for unknown commands and otherwise has the meaning "repeat transmission". If on the other hand a magnetic card reader is present, then the acknowledgement code 'FA' is returned which has the meaning of a positive acknowledgement ("acknowledge").

Following this, data supplied from the magnetic card reader are stored in an internal memory of the keyboard processor 18. If the data are complete, if no keyboard operation is active on the key matrix 19, and no message is being transmitted from the personal computer to the keyboard or from the keyboard to the personal computer, then the keyboard processor sends the data. In this case first of all a dummy key code is transmitted, which is detected by the keyboard controller 15 as a permissible key code and processed, but to which no key is assigned on the connected keyboard, for example '65'. The transmission procedure is as follows in pseudo-code:

```
procedure perform_SCR;
pragma base 16;
begin
        if SCR_exists and SCR_enabled and SCR_data_in_buffer
        then    send(065);              // scan code denotes
                send(060);              // key that is unused
                send_track_data(1);
                send_track_data(2);
                send_track_data(3);
                send(044);              // end of message
        fi;
end;
procedure send_track_data(x);
// transmits startcode for track, status byte,
// three length bytes and data, stop and LRC
pragma base 16;
begin
        if track_exists(x)
        then    send(040+x);
                if no_data(x)
                        then send(049);
                                exit;
                        else if valid_data_for_track(x)
                        then send(048);
                                send_length(x);
                                send_data(x);
                                exit;
                        else send(04A);         // bad data, read error
                        fi;
                fi;
end;
procedure send_length(x);
// transmits always three decimal digits
pragma base 10;
local i,j;
begin
        i = data_length_track(x);
        j = i div 100;
send(48+j)
        i = i − j*100;
        j = i div 10;
        send(48+j);
        i = i − j*10;
        send(48+i);
end;
                The transmission format is therefore:
Start,          TrackNo1, Status, Number, Data,
                TrackNo2, Status, Number, Data,
                TrackNo3, Status, Number, Data, End
```

The individual parts of the transmission format are defined here as follows:

| | | |
|---|---|---|
| Start: | '65H', '60H' | |
| TrackNo1: | '41H' | Identifier for data from track 1 |
| TrackNo2: | '42H' | Identifier for data from track 2 |
| TrackNo3: | '43H' | Identifier for data from track 3 |
| End: | '44H' | Identifier for end of data from SCR |
| Status: | '48H' | Everything OK |
| | '49H' | Start character not found, no data transmitted |
| | '4AH' | LRC character incorrect, no data transmitted |
| | '4BH' | Parity error, no data transmitted |
| Number: | '3XH', '3XH', '3XH' Number of bytes read Example: '30H', '38H', '32H' = 82 bytes | |
| Data: | Data with end character and LRC without start character | |
| | One example of transmission is as follows: | |

Data on the card:

| | |
|---|---|
| Track1: | Empty |
| Track2: | 9 bytes data: 00, 03, 05, 07, 01, 08, 09, 00, 02 |
| | End byte: 0F, LRC: 07 |
| Track3: | No magnet head fitted |

The keyboard must therefore output the following data:

| | TRCK1 | TRCK2 | | TRACK 2 DATA | | | | | | | | | | | EN |
|---|---|---|---|---|---|---|---|---|---|---|---|---|---|---|---|
| START | EMPTY | OK | NUMBER | 0 | 3 | 5 | 7 | 1 | 8 | 9 | 0 | 2 | ST | LR | DE |
| 10 | 47 | 83 | 7D 0A 75 | 32 31 31 | 0B | 1E | 25 | 36 | 76 | 3D | 3E | 0B | 16 | 0D | 36 | 09 |

The following data arrive in the system (output of the keyboard controller 15):

| | TRCK1 | TRCK2 | | TRACK 2 DATA | | | | | | | | | | | EN |
|---|---|---|---|---|---|---|---|---|---|---|---|---|---|---|---|
| START | EMPTY | OK | NUMBER | 0 | 3 | 5 | 7 | 1 | 8 | 9 | 0 | 2 | ST | LR | DE |
| 65 | 60 | 41 49 | 42 48 | 30 | 31 | 31 | 40 | 03 | 05 | 07 | 01 | 08 | 09 40 | 02 0F | 07 44 |

The data are coded here in accordance with Table 1 further below.

Figure 3:
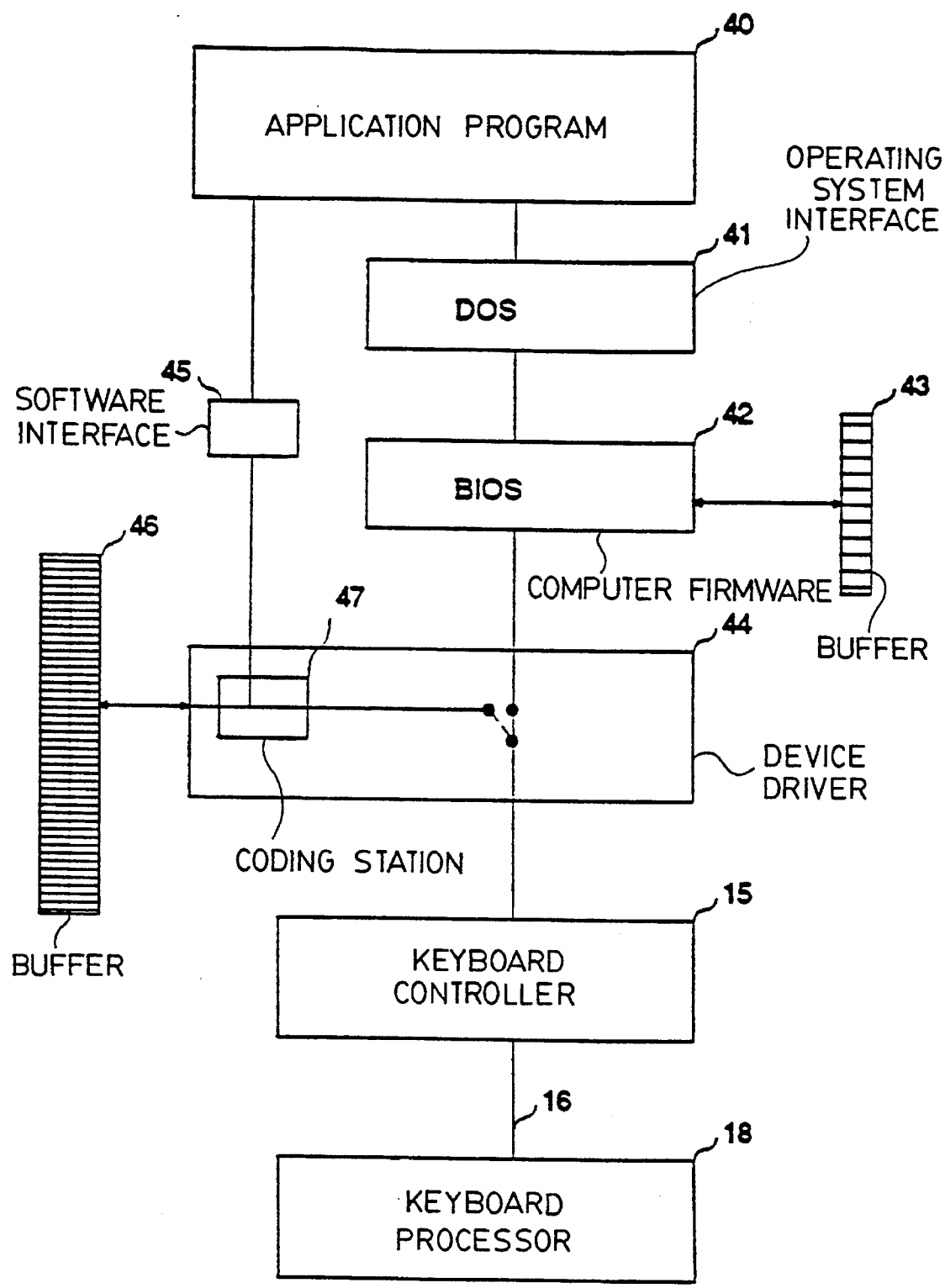
FIG. 3 shows the structure of the software in the personal computer.

FIG. 3 shows the corresponding processing in the personal computer. An application program 40, which processes keyboard and SCR data, first of all uses the normal interface for keyboard handling 41 in the operating system (DOS), which in particular has an interface to the firmware 42 of the computer (BIOS) which takes keyboard data from a buffer 43 filled with the data from the keyboard controller 15. To use the SCR, a device driver 44 is installed and a new software interface 45 is provided. The device driver 44 now takes the data of the keyboard controller 15 and normally passes them on unchanged to the BIOS. As a result of an instruction at the interface 45, the device driver 44 activates the keyboard processor 18 by sending the code 'DO', as described above. Data of the magnetic card reader begin with the code '65', likewise as described above. This code is evaluated by the device driver 44 and has the result that all the following data up to and including the end character are stored in a second, larger buffer 46 and are not forwarded to the BIOS 42. Subsequent data which correspond to keyboard operations of actually existing keys are again forwarded unchanged to the BIOS. The data of the magnetic card reader are translated back into the original code by a coding station 47 before or after the buffering and are transmitted to the application program 40 via the interface 45.

As a further input device, a keyswitch 23 is shown in FIG. 1, in which the customary plurality of positions is not shown. Each change of position is coded as a function key operation, namely transmitted as a release (break) of the previous position and activation (make) of the new position. The keyswitch input is enabled by the code 'D1'. The make code of the corresponding key is sent so that the position can be interrogated due to renewed enabling. Table 2 shows a possible coding for a plurality of positions. This procedure is also suitable for transmitting the status for the magnetic card reader if its interface (21) provides corresponding status information.

Figure 2:
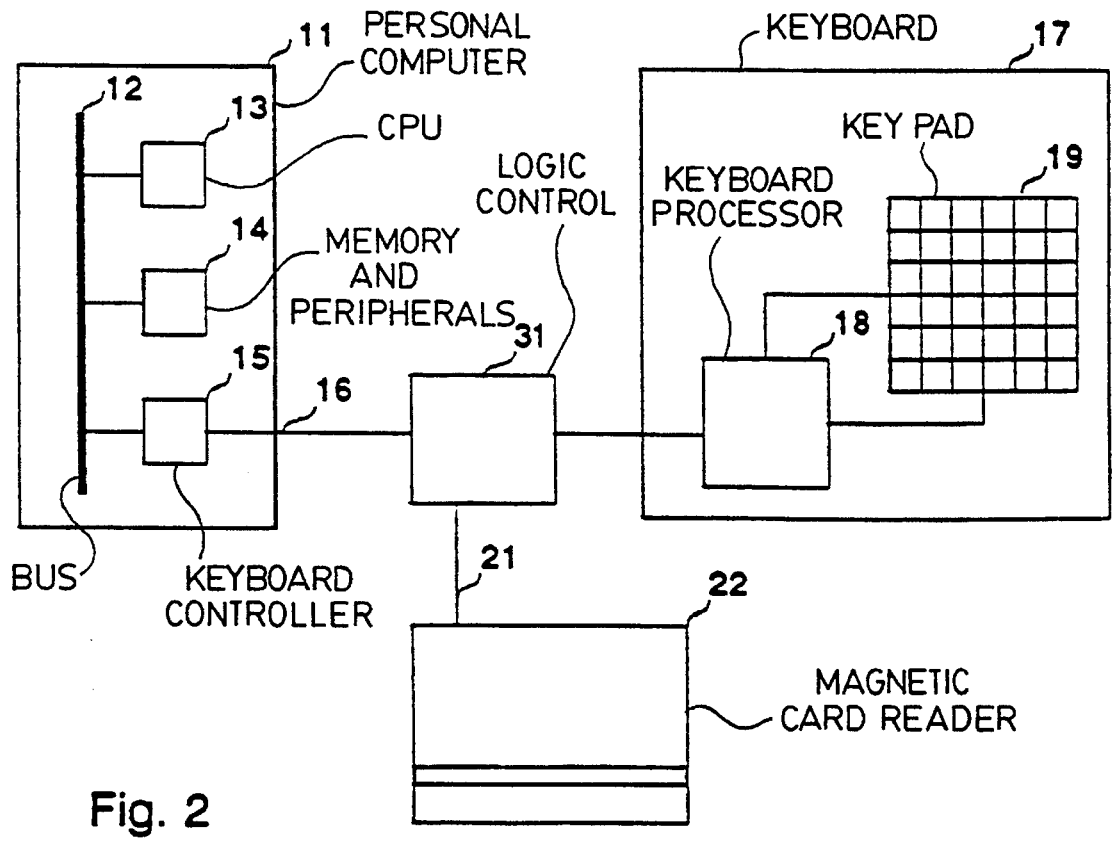
FIG. 2 shows the connection of the input device via a control logic means interposed.

In FIG. 2, the magnetic card reader 22 is shown connected, not to the keyboard processor 18, but to its own control logic means 31, which as a rule transmits the data unchanged from and to the keyboard processor 18. The only difference is that the procedures relating to the magnetic card reader 22 described above are performed by the control logic means 31.

Although other modifications and changes may be suggested by those skilled in the art, it is the intention of the inventors to embody within the patent warranted hereon all changes and modifications as reasonably and properly come within the scope of their contribution to the art.

TABLE 1

Coding of the data of the magnetic card reader

| Read data | Output key | Key no. | 8042 recoding | System |
|---|---|---|---|---|
| 00 | 0B | 67 | 40 → | 00 |
| 01 | 76 | 90 | 01 | 01 |
| 02 | 16 | 2 | 02 | 02 |
| 03 | 1E | 3 | 03 | 03 |
| 04 | 26 | 4 | 04 | 04 |
| 05 | 25 | 5 | 05 | 05 |
| 06 | 2E | 6 | 06 | 06 |
| 07 | 36 | 7 | 07 | 07 |
| 08 | 3D | 8 | 08 | 08 |
| 09 | 3E | 9 | 09 | 09 |
| 0A | 46 | 10 | 0A | 0A |
| 0B | 45 | 11 | 0B | 0B |
| 0C | 4E | 12 | 0C | 0C |
| 0D | 55 | 13 | 0D | 0D |
| 0E | 66 | 15 | 0E | 0E |
| 0F | 0D | 16 | 0F | 0F |
| 10 | 15 | 17 | 10 | 10 |
| 11 | 1D | 18 | 11 | 11 |
| 12 | 24 | 19 | 12 | 12 |
| 13 | 2D | 20 | 13 | 13 |
| 14 | 2C | 21 | 14 | 14 |
| 15 | 35 | 22 | 15 | 15 |
| 16 | 3C | 23 | 16 | 16 |
| 17 | 43 | 24 | 17 | 17 |
| 18 | 44 | 25 | 18 | 18 |
| 19 | 4D | 26 | 19 | 19 |
| 1A | 54 | 27 | 1A | 1A |
| 1B | 5B | 28 | 1B | 1B |
| 1C | 5A | 43 | 1C | 1C |
| 1D | 14 | 30 | 1D | 1D |
| 1E | 1C | 31 | 1E | 1E |
| 1F | 1B | 32 | 1F | 1F |
| 20 | 23 | 33 | 20 | 20 |
| 21 | 2B | 34 | 21 | 21 |
| 22 | 34 | 35 | 22 | 22 |
| 23 | 33 | 36 | 23 | 23 |
| 24 | 3B | 37 | 24 | 24 |
| 25 | 42 | 38 | 25 | 25 |
| 26 | 4B | 39 | 26 | 26 |
| 27 | 4C | 40 | 27 | 27 |
| 28 | 52 | 41 | 28 | 28 |
| 29 | 0E | 1 | 29 | 29 |
| 2A | 12 | 44 | 2A | 2A |
| 2B | 5D | 14 | 2B | 2B |
| 2C | 1A | 46 | 2C | 2C |
| 2D | 22 | 47 | 2D | 2D |
| 2E | 21 | 48 | 2E | 2E |
| 2F | 2A | 49 | 2F | 2F |
| 30 | 32 | 50 | 30 | 30 |
| 31 | 31 | 51 | 31 | 31 |
| 32 | 3A | 52 | 32 | 32 |
| 33 | 41 | 53 | 33 | 33 |
| 34 | 49 | 54 | 34 | 34 |
| 35 | 4A | 55 | 35 | 35 |
| 36 | 59 | 57 | 36 | 36 |
| 37 | 7C | 106 | 37 | 37 |
| 38 | 11 | 58 | 38 | 38 |
| 39 | 29 | 61 | 39 | 39 |
| 3A | 58 | 64 | 3A | 3A |
| 3B | 05 | 70 | 3B | 3B |
| 3C | 06 | 65 | 3C | 3C |

TABLE 1-continued

Coding of the data of the magnetic card reader

| Read data | Output key | Key no. | 8042 recoding | System |
|---|---|---|---|---|
| 3D | 04 | 71 | 3D | 3D |
| 3E | 0C | 66 | 3E | 3E |
| 3F | 03 | 72 | 3F | 3F |
| TrNo1 | 83 | 73 | 41 → | TrNo1 |
| TrNo2 | 0A | 68 | 42 → | TrNo2 |
| TrNo3 | 01 | 74 | 43 → | TrNo3 |
| End | 09 | 69 | 44 → | End |
| 45 | 77 | 95 | 45 | |
| 46 | 7E | 100 | 46 | |
| 47 | 6C | 91 | 47 | |
| OK | 75 | 96 | 48 → | OK |
| Start err. | 7D | 101 | 49 → | Start err. |
| LRC/P err. | 7B | 107 | 4A → | LRC/P err. |
| 4B | 6B | 92 | 4B | (P = parity) |
| 4C | 73 | 97 | 4C | |
| 4D | 74 | 102 | 4D | |
| 4E | 79 | 108 | 4E | |
| 4F | 69 | 93 | 4F | |
| 50 | 72 | 98 | 50 | 50 |
| 51 | 7A | 103 | 51 | 51 |
| 52 | 70 | 99 | 52 | 52 |
| 53 | 71 | 104 | 53 | 53 |
| 54 | 7F/84 | 105 | 54 | 54 |
| 55 | 60 | res | 55 | 55 |
| 56 | 61 | res | 56 | 56 |
| 57 | 78 | res | 57 | 57 |
| 58 | 07 | res | 58 | 58 |
| 59 | 0F | res | 59 | 59 |
| 5A | 17 | res | 5A | 5A |
| 5B | 1F | res | 5B | 5B |
| 5C | 27 | res | 5C | 5C |
| 5D | 2F | res | 5D | 5D |
| 5E | 37 | res | 5E | 5E |
| 5F | 3F | res | 5F | 5F |
| 60 | 47 | res | 60 | 60 |
| 61 | 4F | res | 61 | 61 |
| 62 | 56 | res | 62 | 62 |
| 63 | 5E | res | 63 | 63 |
| 64 | 08 | res | 64 | 64 |
| 65 | 10 | res | 65 | 65 |
| 66 | 18 | res | 66 | 66 |
| 67 | 20 | res | 67 | 67 |
| 68 | 28 | res | 68 | 68 |
| 69 | 30 | res | 69 | 69 |
| 6A | 38 | res | 6A | 6A |
| 6B | 40 | res | 6B | 6B |
| 6C | 48 | res | 6C | 6C |
| 6D | 50 | res | 6D | 6D |
| 6E | 57 | res | 6E | 6E |
| 6F | 6F | res | 6F | 6F |
| 70 | 13 | res | 70 | 70 |
| 71 | 19 | res | 71 | 71 |
| 72 | 39 | res | 72 | 72 |
| 73 | 51 | res | 73 | 73 |
| 74 | 53 | res | 74 | 74 |
| 75 | 5C | res | 75 | 75 |
| 76 | 5F | res | 76 | 76 |
| 77 | 62 | res | 77 | 77 |
| 78 | 63 | res | 78 | 78 |
| 79 | 64 | res | 79 | 79 |
| 7A | 65 | res | 7A | 7A |
| 7B | 67 | res | 7B | 7B |
| 7C | 68 | res | 7C | 7C |
| 7D | 6A | res | 7D | 7D |
| 7E | 6D | res | 7E | 7E |
| 7F | 6E | res | 7F | 7F |
| FF | 00 | err | FF | FF |

Table explanation:
Read data: Data read from the card.

Output key: Scan code which the keyboard must output.
Key no.: Key associated with the scan code.
8042 recoding: System scan code which the 8042 recodes.
System: The data which the driver generates from it again.

TABLE 2

Coding of the data of a keyswitch

| Key position | Make | Break |
|---|---|---|
| 1 | 10, 51 | 10, F0, 51 |
| 2 | 10, 52 | 10, F0, 52 |
| 3 | 10, 53 | 10, F0, 53 |
| 4 | 10, 54 | 10, F0, 54 |
| 5 | 10, 55 | 10, F0, 55 |
| 6 | 10, 56 | 10, F0, 56 |

We claim:

1. A method for operating an input device at a keyboard connected to a personal computer having a keyboard controller via a data transmission means, the keyboard having a keyboard processor, the method comprising the steps of:

sending key codes from the keyboard processor to the personal computer, rejecting any predetermined impermissible codes and only forwarding permissible codes;

defining some of the permissible codes as dummy key codes which cannot be generated by operating the keys of the keyboard;

converting the data of the input device into permissible codes;

sending at the same time as or after the operation of the input device from the keyboard processor a dummy key code which identifies data following thereafter as originating from the input device.

2. A method as claimed in claim 1, the method further comprising the following steps:

sending command codes from the keyboard controller to the keyboard processor;

automatically sending to the keyboard processor data provided by the input device, provided that an operating mode corresponding to said data was requested by a command code representing an enable code.

3. A method as claimed in claim 2, the method further comprising the steps of:

emitting a response from the keyboard processor when an input device is connected or operational to the enable code with an acknowledgement code which is the same as the acknowledgement code for error-free execution of other command codes;

emitting a response from the keyboard processor when an input device is one of unconnected and is inoperational with a repeat code which is the same as the repeat code after transmission of undefined command codes.

4. A method as claimed in claim 1, further comprising the steps of transmitting a change of operating status of the input device by transmission of a dummy key code;

transmitting a status of the input device if an enable code is used, and sending dummy key codes that correspond to a status change to the actually existing status.

* * * * *